Feb. 6, 1968  C. E. ANDERSON  3,367,355
APPARATUS FOR OFFSHORE LOADING AND UNLOADING OF SHIPS
Filed Sept. 16, 1963  2 Sheets-Sheet 1
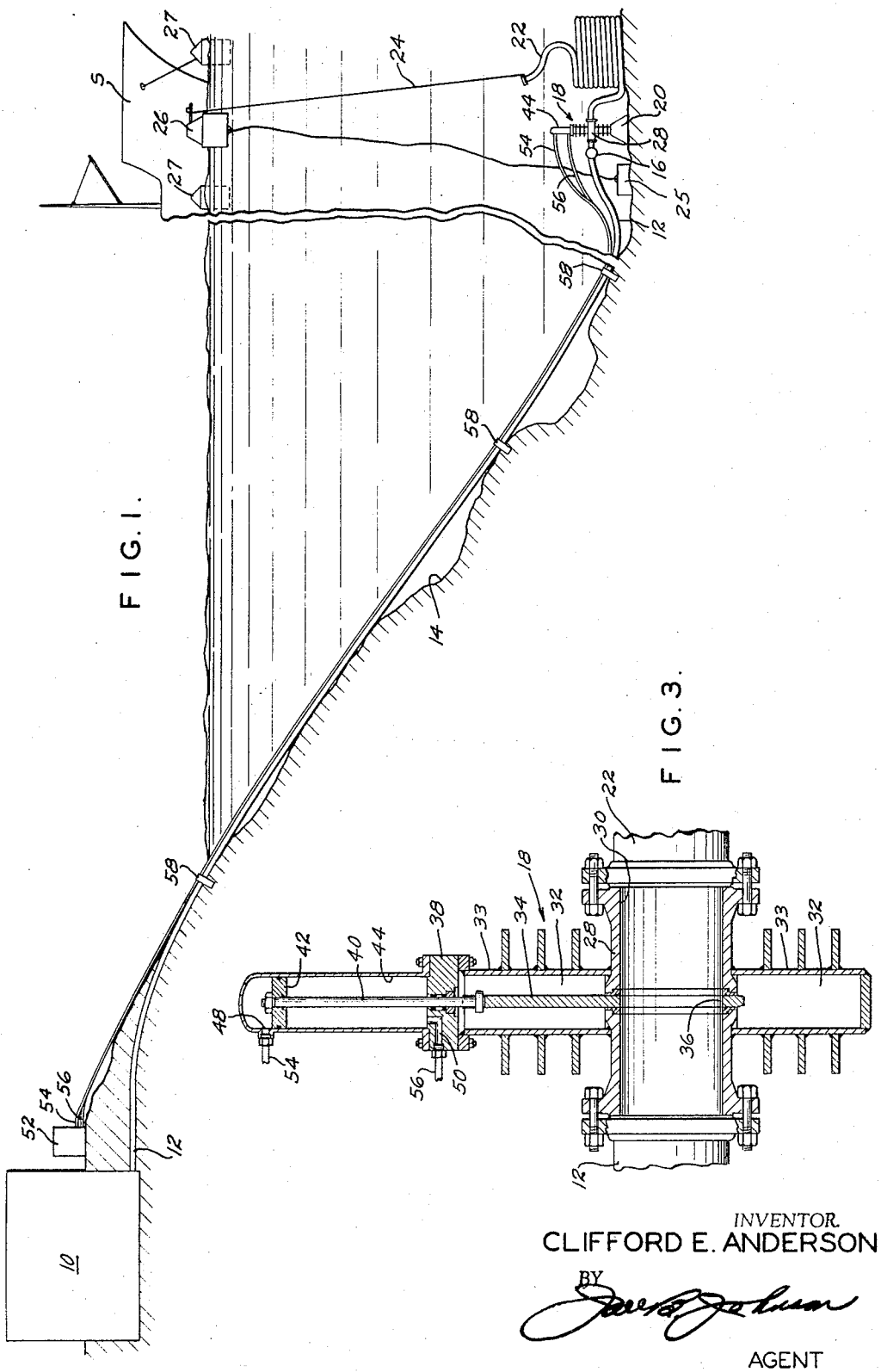
INVENTOR.
CLIFFORD E. ANDERSON
BY
AGENT

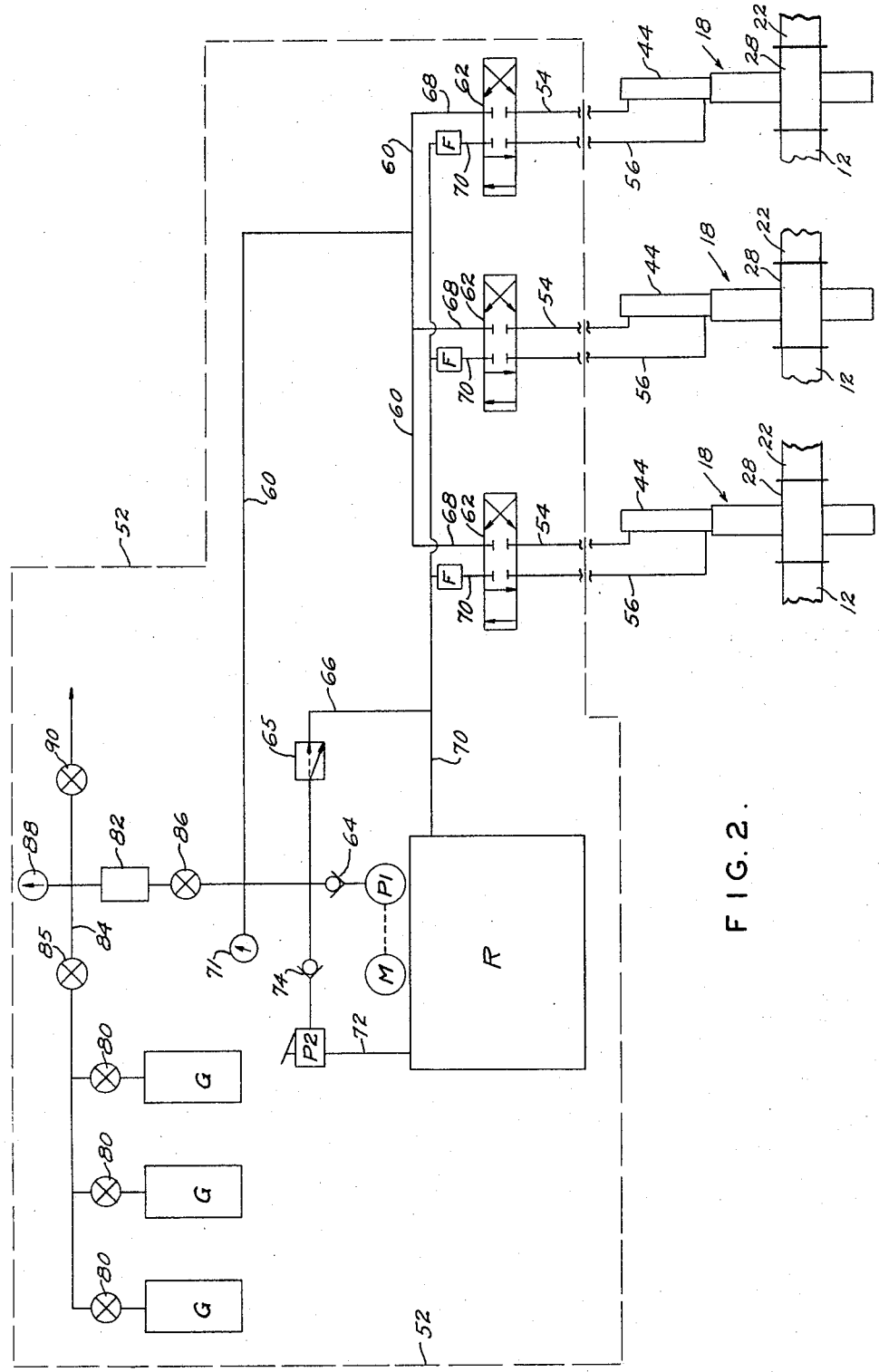

United States Patent Office
3,367,355
Patented Feb. 6, 1968

3,367,355
APPARATUS FOR OFFSHORE LOADING AND UNLOADING OF SHIPS
Clifford E. Anderson, Houston, Tex., assignor to ACF Industries, Incorporated, New York, N.Y., a corporation of New Jersey
Filed Sept. 16, 1963, Ser. No. 308,953
7 Claims. (Cl. 137—209)

This invention relates to apparatus for offshore loading and unloading of ships and particularly to such apparatus for loading and unloading fluids, such as hydrocarbons, gasolines, crude oil and the like.

Ships carrying fluids, such as oil tankers, commonly have drafts of fifty to seventy-five feet or more today and in order to obviate the building of onshore permanent terminals and dredging a channel to the terminals, ships are loaded and unloaded offshore. Usually when ships are loaded and unloaded offshore, they are moored to an offshore terminal on which valves are located for controlling the flow of fluids to and from the ships. The open sea loading and unloading of tankers usually consist of extending a pipeline along the sea bed from a convenient onshore position to an open sea position where ships can navigate and which is sufficiently deep for clearance requirements. At the open sea position, the pipeline extends upwardly to a loading terminal on which valves are arranged to control the flow of fluids. Flexible loading hoses usually extend between the valves on the open sea location and the tanker for loading. In this manner, land based docks and loading lines are completely eliminated as well as the provision of a slip for the ship and dredging problems associated with the slip, and problems involved in providing a reasonably quiet berth for the ship while loading or unloading.

When floating or fixed platforms are used on the open sea for loading and unloading of tankers, the ships are normally moored in position adjacent the platform. Especially in rough weather there is the risk that the ship may foul the platform or may move a considerable distance from the platform thereby risking damage to the connections between the terminal and ship as well as damage to the loading platform and valves. Offshore loading and unloading are becoming increasingly popular as tanker vessels of very large size and capacity are being developed. Existing ports and harbors are often not sufficiently large or sufficiently deep to accommodate vessels of such size and it is not always economical to reconstruct such harbors or to dredge them to accommodate such vessels. Also, offshore loading lends itself to areas of the world where harbor and docking facilities are not available.

It is an object of the present invention to provide for offshore loading and unloading of ships with fluids without the use of offshore fixed or floating terminals from which the ships receive or discharge fluids.

A further object of this invention is the provision of apparatus for loading and unloading fluids from ships from an area generally beneath the ship to be loaded or unloaded.

An additional object of the invention is to provide apparatus for loading and unloading fluids from ships which is controlled by a control unit located onshore remote from the sea valve and controlling the flow of fluid through the pipeline.

Briefly described, the invention comprises apparatus for offshore loading and unloading of ships with fluids having a pipeline extending from shore along the sea bed to a position at a substantial distance from the shore to provide an adequate depth of water for the draft of relatively large ships, a sea valve in the pipeline positioned on the sea bed generally adjacent the end of the pipeline and in an area generally beneath the ship to be loaded or unloaded for controlling the flow of fluid through the pipeline, and a control unit for the valve located onshore at a position remote from the sea valve. A flexible hose communicates with the pipeline adjacent the valve and is connected to a floating buoy or the like on the surface of the sea where it may be easily engaged from a ship for loading and unloading. Since the sea valve is located on the sea bed and is controlled from a position onshore remote from the sea valve, the sea valve does not require any terminal on which to be mounted and it does not interfere with the ships in any manner. An end of the flexible hose may, for example, be supported by a buoy which is easily located by a ship, or a rope may be secured to the buoy at one end and secured at its other end to the flexible hose. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated;

FIGURE 1 is a diagrammatic view of the present invention indicating apparatus for offshore loading and unloading of ships with fluids;

FIGURE 2 is a diagrammatic view of an onshore control unit for controlling the flow of fluids through the pipeline and seat valve on the sea bed; and FIGURE 3 is a sectional view of the sea valve employed in the apparatus shown in FIGURE 1 and located on the sea bed in an area generally beneath the ship to be loaded and unloaded.

Corresponding reference characters indicate corresponding parts throughout the several views of the drawings.

Referring to FIGURE 1, an oil storage facility is indicated at 10, such as might be commonly located onshore at an oil refinery near an ocean or sea. A pipeline 12 extends from storage facility 10 along the sea bed 14 to a position where the depth of the sea is, for example, at least 80 feet deep to permit oil tankers having large drafts to load and unload. Pipeline 12, for example, may be 30 inches in diameter and may extend 3,000 feet or more from shore in order for the water to reach such a depth. A header 16 forms an end of pipeline 12.

Communicating with a header pipe 16 of pipeline 12 is a valve indicated generally at 18 for controlling the flow of fluids through pipeline 12. Header pipe 16 is adapted to be connected to a plurality of valves 18 and has a plurality of branch connections, each of which may be connected to a valve 18. FIGURE 1 shows only a single valve 18 connected to header pipe 16. However, it is to be understood that a bank of valves is connected to header pipe 16 as indicated schematically in FIGURE 2. Valves 18 are positioned on sea bed 14 and a weight 20 anchors or secures valves 18 in position.

Extending from each valve 18 is a flexible hose 22 of a sufficient length to extend to the surface of the sea and to have a sufficient length for connection to a buoy. FIGURE 1 shows a guide line 24 secured at its upper end to a marker buoy 26 which indicates the location of flexible hose 22. Buoy 26 is anchored to the sea bed by weight 25.

The lower end of guide line 24 is secured to flexible hose 22 and hose 22 is easily retrieved by pulling in of guide line 24. A ship S to be loaded or unloaded is normally secured to mooring buoys 27 adjacent marker buoy 26. Hose 22 is capped on its end and may be connected to a suitable ship pipeline for receiving or discharging fluids. By having hose 22 resting on the sea bed, it is protected from heavy seas and fouling by ships and the like, such as when ship S is being secured to mooring buoys 27. It is to be understood that flexible hose 22 may be removably or permanently secured directly to a marker buoy 26 instead of to guide line 24 such as shown in FIGURE 1.

Referring to FIGURE 3, each valve 18 is of the gate valve type and has a main casing or housing 28 forming a fluid pasage 30 therethrough. Mounted in a gate chamber 32 formed by a sheet metal housing 33 about casing 28 is a reciprocating slab gate 34 comprising a substantially flat metal plate having a passage 36 adapted to register with passage 30 when gate 34 is open to permit an uninterrupted flow of fluid. When valve 18 is closed, gate 34 extends across passage 30 and blocks fluid flow through passage 30. A bonnet or head 38 forms the upper portion of housing 28.

For raising and lowering gate 34, a stem 40 extends through a sealed passage in bonnet 38 and is connected to gate 34. Secured adjacent the upper end of stem 40 opposite gate 34 is a piston 42 mounted for reciprocation within cylinder 44. Bonnet 38 encloses the lower end of cylinder 44 and secures cylinder 44 to housing 33. Fluid ports 48 and 50 permit the flow of fluid to and from cylinder 44.

For controlling the operation of valve 18 at a location remote from the valve and forming an important feature of this invention, a control unit designated generally 52 is positioned onshore as indicated in FIGURE 1. Referring also to FIGURE 2, fluid control pilot lines 54 and 56 extend from control unit 52 to cylinder 44. Suitable retainers 58, such as metal straps, secure lines 54 and 56 to pipeline 12.

Fluid is supplied from a reservoir R to a pump P1 which is driven by an electric motor M. Supply line 60 extends from pump P1 to operate a four-way valve 62 for each sea valve 18. A check valve 64 in line 60 adjacent pump P1 prevents a back flow of fluid to the pump. A pressure relief valve 65 in return line 66 to reservoir R is actuated at a predetermined fluid pressure to prevent an excessive pressure being reached in line 60.

Each four-way valve 62 is independently operated and, for example, may be manually operated or solenoid operation. Valve 62 has three positions, viewing FIGURE 2; a center neutral position in which the flow of fluid is stopped to valve 18; a left position in which valve 62 is moved to the left and fluid is supplied to line 56 to raise gate 34; and a right position in which valve 62 is moved to the right and fluid is supplied to line 54 to lower gate 34. Branch lines 68 supply fluid to valves 62 from supply line 60 and branch return lines 70 return fluid to reservoir R from valves 62. A pressure gauge 71 indicates the fluid pressure within line 60. Positioned in each return line 70 is a flow indicator F which monitors the volume of fluid returned to reservoir R from the associated cylinder 44. In this manner the position of gates 34 may be accurately determined for gauging the flow through pipeline 12 and to insure that gate 34 is fully opened or closed. Fow indicator F may be of a conventional type for determining the volume of flow.

Operation is as follows:

A ship which is anchored or secured to mooring buoys 27 is connected to flexible hose 22 for loading or unloading of fluids. Gates 34 will normally be in closed position and after the ship has been made suitable connection with flexible hose 22, motor M is energized to drive pump P1 and fluid is supplied to supply line 60 and four-way valves 62. The four-way valves are moved to the left viewing FIGURE 2 and fluid is supplied from lines 68 through control lines 56 to raise gates 34. Upon the raising of gates 34, fluid is supplied through pipeline 12 from storage facility 10 to the ship through flexible hose 22, in the event the ship is being loaded. If the ship is being unloaded, fluid is supplied to storage facility 10 from the ship. Flow indicator F for each valve 18 indicates the position of the associated gate 34 and when gates 34 are fully opened, motor M and pump P1 may be deenergized to stop the flow of fluid to four-way valve 62. Upon return of four-way valve 62 to its center neutral position, the flow of fluid to and from cylinder 44 is stopped. Gates 34 remain in the open position reached when four-way valve 62 is returned to center position.

To stop the flow of fluid through pipeline 12, motor M and pump P1 are energized and valves 62 are moved to the right viewing FIGURE 2. Fluid is supplied through control lines 54 to lower gates 34. The position of gates 34 may be indicated by flow indicators F and valves 62 are returned to neutral center position when gates 34 are lowered and closed.

In the event motor M is inoperable, such as might occur when a supply of electrical energy is not available, a manually operated pump P2 is provided to pump fluid from reservoir R. Pump P2 supplies fluid from reservoir R through line 72 to line 60. A check valve 74 prevents the return of fluid through line 72. Pump P2 operates piston 32 in the same manner as pump P1 to open and close gates 34.

As an alternate means of actuating valves 18 such as might be necessary when both pumps P1 and P2 are inoperable, a gas pressure system is connected to line 60. Bottled nitrogen gas in cylinders G, each of which is independently controlled by a suitable valve 80, communicates with an accumulator 82 through a gas or fluid line 84. A valve 85 in fluid line 84 is movable between open and closed positions and pressurizes accumulator 82. Accumulator 82 maintains an auxiliary supply of hydraulic fluid in a casing suitable for pressurizing. A valve 86 when opened supplies the pressurized hydraulic fluid from the accumulator 82 to line 60 thereby to actuate valves 62 for opening and closing gates 34. A pressure gauge 88 indicates gas pressure in line 84. Valve 90 when opened vents line 84 to atmosphere.

While the apparatus has been indicated in the drawings as unloading and loading crude oil and gasolines, it is to be understood that this apparatus may be employed for loading and unloading any suitable fluids where it is desired to load and unload ships offshore without fixed or floating terminals. By placing valves 18 on a sea bed generally beneath the ships to be loaded or unloaded, no terminal or facility need be built on which to mount the valves. Thus, the ships do not interfere with such terminals even in rough weather. Gate valves in the pipeline having piston operators are controlled remotely from onshore positions and have been found to be highly reliable in operation.

In view of the above, it will be seen that the several objects of the invention are achieved and other advantageous results obtained.

As various changes could be made in the above constructions without departing from the scope of the invention, it is intended that all matter contained in the above description and shown in the accompanying drawings shall be interpreted as illustrative and not in a limiting sense.

What is claimed is:

1. In apparatus for offshore loading and unloading of ships with fluids, a pipeline extending from shore along the sea bed to a position at a substantial distance from the shore to provide an adequate depth of water for the draft of relatively large ships, a gate valve in the pipeline positioned on the sea bed generally adjacent the end of the pipeline and in an area generally beneath the ship to be loaded and unloaded, said gate valve comprising a housing having a longitudinally extending fluid passage therethrough and connected at one end to the pipeline, a gate mounted within said housing for sliding movement across and away from the fluid passage for opening and closing the passage, a stem connected at one end to the gate for operating the gate, the opposite end of the stem extending from the housing, a cylinder surrounding the extending end of the stem, and a piston movable back and forth in the cylinder and connected to said stem for opening and closing the gate, a flexible hose communicating with the pipeline adjacent the gate valve and of a length sufficient to extend at least to the surface of the sea, means adjacent the surface of the sea to support the flexible hose whereby a ship or the like may easily connect to said hose for receiving or discharging fluids, a hydraulic fluid control unit at a position remote from the valve and out of the sea for controlling the opening and closing of the gate valve, a pair of hydraulic control pilot lines extending from said cylinder along the sea bed to the fluid control unit for supplying fluid to and returning fluid from the cylinder, said fluid unit comprising means to reverse the flow of fluid in said pilot lines for alternate opening and closing of the gate valve, and means to supply hydraulic fluid under pressure to said cylinder through said pilot lines.

2. In apparatus for offshore loading and unloading of ships with fluids as set forth in claim 1, said means to supply hydraulic fluid under pressure comprising a reservoir, a fluid pump to pump fluid from the reservoir to the pilot lines, and an electric motor to drive said fluid pump, and a second pump connected to the reservoir to supply fluid from the reservoir to the pilot lines, said second pump being manually operated independently of said first-mentioned pump and operable as an alternate pumping source when said first-mentioned pump in rendered inoperable.

3. In apparatus of offshore loading and unloading of ships with fluids as set forth in claim 2, said means to reverse the flow of fluid in said fluid control lines being a four-way valve, a return line to the reservoir from the four-way valve, and a flow indicator in said return line to indicate the flow of fluid from the piston thereby to determine the position of the gate in said gate valve.

4. In apparatus for offshore loading and unloading of ships with fluids as set forth in claim 3, a source of pressurized gas adapted to be placed in selective fluid communication with a source of hydraulic fluid for said pilot lines for operation of said piston and opening and closing of said gate, and means to control selectively the flow of gas.

5. In apparatus for offshore loading and unloading of ships with fluids, a pipeline extending from shore along the sea bed to a position at a substantial distance from the shore to provide an adequate depth of water for the draft of relatively large ships, a sea valve in the pipeline positioned on the sea bed generally adjacent the end of the pipeline and in an area generally beneath the ship to be loaded or unloaded, a valve member in said sea valve adapted for movement to open and close the sea valve, a piston operator on the valve for opening and closing the valve member, said piston operator including a hydraulically energized cylinder and a piston movable back and forth within the cylinder for opening and closing the valve member, a flexible hose communicating with the pipeline adjacent the sea valve and of a length sufficient to extend to the surface of the sea, means adjacent the surface of the sea to support the flexible hose whereby a ship or the like may easily connect to said hose for loading and unloading fluids, a control unit at a position remote from the valve and out of the sea, a pair of hydraulic fluid control pilot lines extending from the control unit to the cylinder on the sea bed, means to reverse the flow of fluid in said pilot lines for alternate opening and closing of hydraulic valve member, said control unit including a fluid reservoir, a fluid pump to supply hydraulic fluid to the cylinder from the reservoir through one of said pair of pilot lines, the other pilot line being a return line to the reservoir, and a flow indicator in said return line to indicate the flow of hydraulic fluid from the cylinder thereby to indicate the position of the valve member in said sea valve.

6. In apparatus for offshore loading and unloading of ships with fluids as set forth in claim 5, an electric motor to drive said fluid pump, and a second pump connected to the reservoir to supply fluid from the reservoir to the pilot lines, said second pump being operated manually independently of the first-mentioned pump and operable as an alternate pumping source when said first pump is rendered inoperable.

7. In apparatus for offshore loading and unloading of ships with fluids as set forth in claim 5, a source of pressurized gas adapted to be placed, selectively, in fluid communication with a source of hydraulic fluid for said pilot lines for operation of said piston, and means to control selectively the flow of gas to said source of hydraulic fluid for operation of said piston in actuation of said sea valves.

References Cited

UNITED STATES PATENTS

| | | | |
|---|---|---|---|
| 2,051,028 | 8/1936 | Crandall | 137—551 X |
| 2,132,132 | 10/1938 | Seat | 137—209 |
| 2,224,844 | 12/1940 | MacFarren | 137—236 X |
| 2,648,201 | 8/1953 | Marancik | 137—236 X |
| 2,802,483 | 8/1957 | Davis | 251—31 X |
| 2,826,165 | 3/1958 | Adelson | 137—551 X |
| 2,955,626 | 10/1960 | Hartley | 137—236 X |
| 3,171,628 | 3/1965 | Natho | 251—25 |

ALAN COHAN, *Primary Examiner.*

H. W. WEAKLEY, *Assistant Examiner.*

UNITED STATES PATENT OFFICE
CERTIFICATE OF CORRECTION

Patent No. 3,367,355                      February 6, 1968

Clifford E. Anderson

It is hereby certified that error appears in the above numbered patent requiring correction and that the said Letters Patent should read as corrected below.

Column 3, line 61, for "Fow" read -- Flow --; column 6, lines 3 and 4, strike out "hydraulically energized" and insert the same before "piston" in line 2, same column 6; same column 6, line 15, for "of" read -- of hydraulic --.

Signed and sealed this 6th day of May 1969.

(SEAL)
Attest:

Edward M. Fletcher, Jr.
Attesting Officer

Commissioner of Patents